April 12, 1938.   C. D. PETERSON   2,113,709
SYNCHRONIZING CLUTCH
Filed March 19, 1935   2 Sheets-Sheet 2
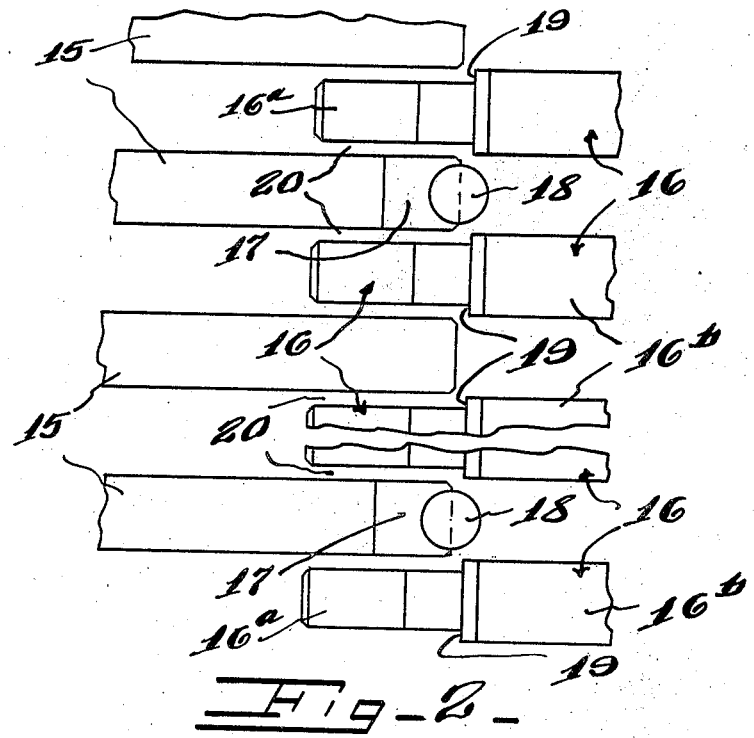
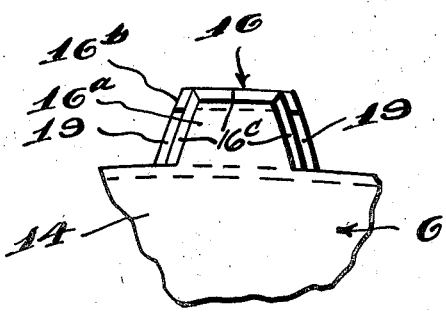
INVENTOR.
Carl D. Peterson
BY
ATTORNEYS Patented Apr. 12, 1938

2,113,709

UNITED STATES PATENT OFFICE 2,113,709

SYNCHRONIZING CLUTCH

Carl D. Peterson, Toledo, Ohio, assignor to Spicer Manufacturing Corporation, Toledo, Ohio, a corporation of Virginia Application March 19, 1935, Serial No. 11,759

4 Claims. (Cl. 192—53)

This invention relates to synchronizing mechanism or clutches for synchronizing two toothed parts, as two clutches or gears, in transmission gearings, such as are used in motor vehicles preliminary to gear shifting operation, in order that any two toothed elements, gears or clutches, may be brought into engagement without clashing.

It has for its object mechanism for first engaging two friction clutch sections rotatable with the two toothed members to be brought into engagement, and then positively stopping the shifting movement until the friction clutch sections are synchronized, and hence, the speeds of the toothed members to be brought into mesh synchronized, which stopping means is released by the slight relative rotary movement of the two members when synchronized.

Other objects will appear through the specification.

The invention consists in the novel features and in the combinations and constructions hereinafter set forth and claimed.

In describing this invention, reference is had to the accompanying drawings, in which like characters designate corresponding parts in all the views.

Figure 2 is an enlarged developed view of the slidably interlocking teeth of two of the sections of the synchronizing clutch hereinafter referred to as the second and third sections.

Figure 3 is an enlarged detail end view of the teeth of the third clutch section.

Figure 1:
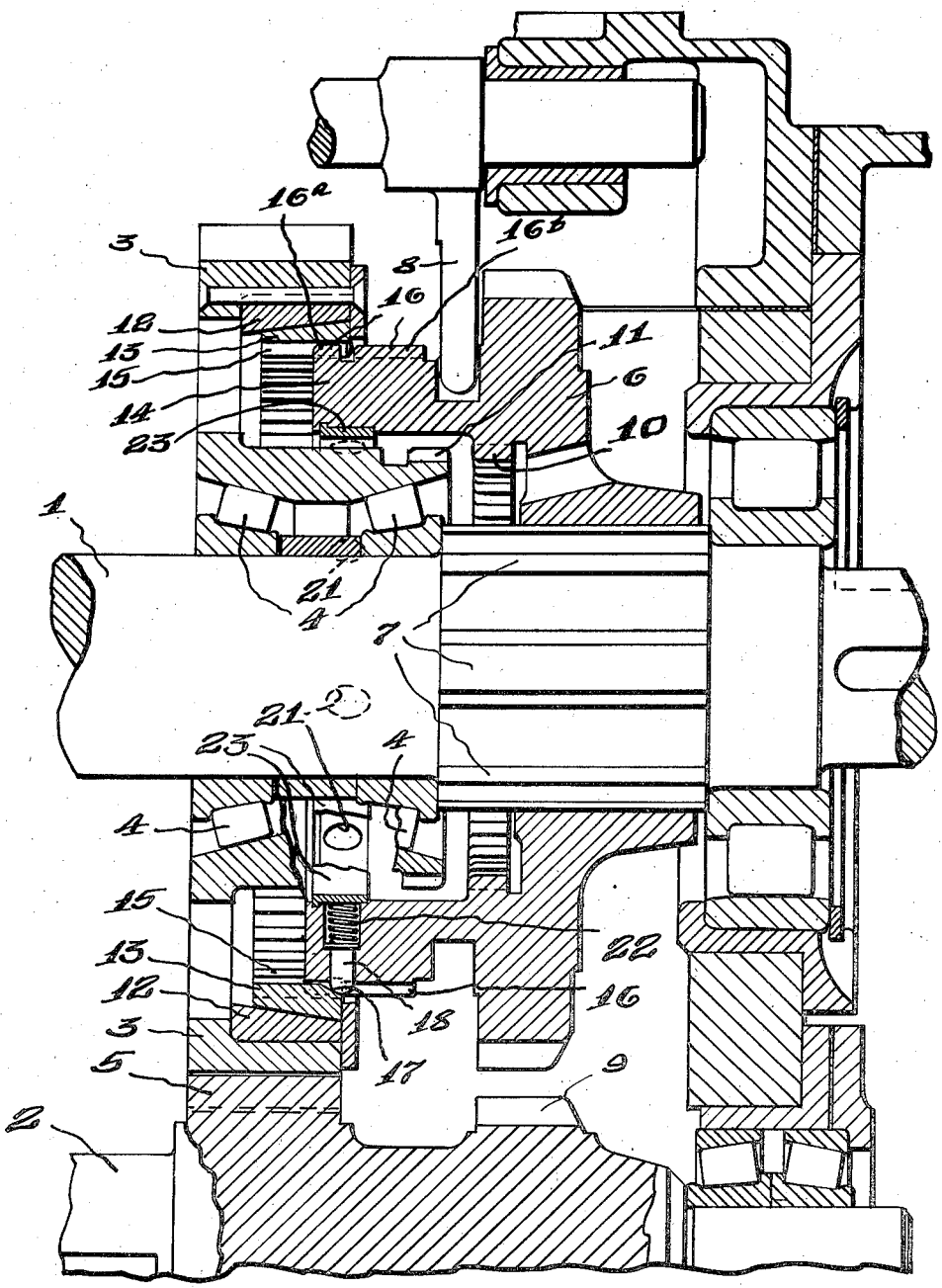
Figure 1 is a fragmentary sectional view through a transmission gearing showing this synchronizing clutch applied to two of the toothed rotary members thereof, one of which is shiftable into and out of engagement with the other.

I have here shown a synchronizing mechanism, as embodied in parts of one of the conventional types of change speed transmission gearing used in motor vehicles. Such transmission gearing, as is well-known, includes a suitable gear box, driving and transmission shafts mounted in axial alinement in the gear box, a countershaft connected to the driving shaft, the countershaft and the transmission shaft being selectively connected, through various pairs of gears, one member of each pair being shiftable into and out of engagement with the other member of the pair to produce different speeds. The driving and transmission shafts are also directly connectable together through a shiftable element. The shiftable gears are usually slidably mounted on the transmission shaft.

In the drawings, 1 designates the transmission shaft of such a transmission gearing; 2 the countershaft. 3 designates a gear normally rotatably or loosely mounted on the transmission shaft through anti-friction bearings 4; and 5 a gear on the countershaft with which the gear 3 meshes.

6 designates a shiftable member rotatable with the transmission shaft 1 and shiftable axially thereof, it being here shown as having internal teeth or splines slidably interlocking the splines 7 on the transmission shaft. This member 6 is shiftable axially by any suitable gear shifting mechanism including a fork 8. The gear shifting mechanism is of any well-known type and is carried by a shift rod selectively operable by a gear shifting lever, not shown. It is thought that for a complete understanding of the invention, further description of the transmission gearing and gear shifting mechanisms is unnecessary, as their general construction and operation is well-known and old.

The member 6 is here shown as a gear and it is shiftable in one direction, as to the right, into mesh with an idler gear, not shown, which meshes with a gear 9 on the countershaft to produce reverse speed, and it is shiftable in the other direction, or to the left of neutral, to bring clutch teeth 10 thereon into interlocking engagement with clutch teeth 11 on the opposing side of the gear 3, for the purpose of connecting or locking the gear 3 to the transmission shaft through the gear 6, so that the power is transmitted to the transmission shaft from the countershaft through the gears 5 and 3. When it is desired to connect the gear 3 to the transmission shaft 1, it is necessary or highly desirable, in order to effect easy and smooth gear shifting, to bring the clutch teeth 10 into mesh with the clutch teeth 11 without clashing, and therefore, to synchronize the speeds of the gears 3 and 6. Before the gear 6 is brought into engagement with the gear 3, the gear 3 is being idly rotated by the countershaft and the gear 6 is rotating at the speed of the transmission shaft 1. The synchronizing is effected through a friction clutch including sections rotatable respectively with the gears 3 and 6.

This clutch includes a section or ring 12 arranged concentric with and rotatable with the gear 3; a second section or synchronizing ring 13 rotatable with the gear 6 and connected thereto through clutch teeth provided on the section 13 and on a third section 14 fixed to the gear 6. The section 13 is provided with internal teeth 15 and the section 14 with external teeth 16 slidably interlocking with the teeth 15, so that the section or synchronizing ring 13 always rotates with the gear 6. The friction section 13 is also shiftable axially with the gear 6 and the gear 6 is also shiftable axially relatively to the synchronizing ring 13 when the ring 13 is shifted to its full extent to frictionally engage the friction ring or first clutch section 12, and the synchronizing ring or second clutch section 13 is so shifted by the shifting movement of the member or gear 6 effected by the gear shifting lever, through means for permitting continued shifting of the gear 6, after the first and second clutch sections 12 and 13 are frictionally engaged.

The means by which this result is effected comprises a spring pressed part carried by the section 14 and coacting with means, as cams, on the section 13, so that as the section 14 is shifted toward the section 13, the spring pressed parts coact with the cams, and cause the section 13 to shift into frictional engagement with the first section 12 before the clutch teeth 10 are brought into engagement with the clutch teeth 11 of the gears 6 and 3 respectively.

As here shown, some of the teeth 15 on the synchronizing ring or second clutch section 13 are provided with bevelled ends 17 on the ends thereof toward the section 14, these bevelled or inclined ends providing cams, and the spring-pressed parts are poppets 18 carried by the section 14 in position to ride up on the cams 17 upon initial shifting movement of the member 6. The spring pressure on the poppets, when acting through the cams 17 causes the second friction section or synchronizing ring 13 to shift into frictional engagement with the first section or friction ring 12. Thereafter upon continued movement of the member 6, the poppets ride on the top faces of the teeth 15 of the synchronizing ring 13 and while riding up over the top, the clutch teeth 10 are being brought into engagement with the clutch teeth 11.

The means for preventing continued shifting of the gear 6, regardless of how much force is applied to the gear shifting lever until the gears 3 and 6 are synchronized, comprises shoulders 19 provided on the teeth 16 and arranged in the path of the corners of the teeth 15 of the synchronizing ring 13, which shoulders remain in engagement preventing further shifting of gear 6 until the speeds of the gears 3 and 6 are synchronized. The teeth 16 are here shown as provided with advance narrow portions 16$^a$ and with wider rear portions 16$^b$, the advance portions 16$^a$ being always arranged between the teeth 15 of the synchronizing ring or second friction clutch section 13 and fitting between the same with a clearance at 20, while the wider portions 16$^b$ slidably fit without undue clearance between the teeth 15. Due to the narrow and wider portions 16$^a$ and 16$^b$, the shoulders 19 are provided at the advance ends of the wider portions. For convenience in manufacturing, the wider and narrow portions are formed by first peripherally grooving the section 14, and the wider and narrow portions being located on the opposite sides of the groove, the wider portions being shown in the drawings as on the right hand side of the groove and the narrower portions on the left hand side.

The margins of the extreme end faces of the advanced portions 16$^a$ of the teeth 16 are bevelled slightly at 16$^c$ at the front corners of said portions 16$^a$, as shown in Figure 3.

The poppets 18 are located between the teeth 16 and are hence alined with the inclined or cam ends of the teeth of the synchronizing ring or second friction clutch section 13, which have the inclined or cam ends. There are a plurality of poppets 18 spaced at suitable intervals around the section 13 and for each poppet, one of the opposing ends of the teeth 15 of the synchronizing ring 13 is bevelled or provided with a cam 17. These spring-pressed poppets are mounted in suitable radial openings 21 enclosing springs 22 which press the poppets 18 radially outward. The poppets are held in the openings 21 by suitable means, as a band 23, encircling the inner periphery of the section 14. This section 14 is an integral part of the gear 6 or an annular flange formed integral with the gear 6.

In gear shifting operations, the drive shaft is disconnected from the engine by the throwing out of the main or engine clutch preliminarily to gear shifting. However, the countershaft continues to run under momentum and the transmission shaft continues to turn at a different speed under the momentum of the vehicle and the motion transmitted thereto from the rear wheels while running under the momentum or coasting, when the engine clutch is thrown out. The speed of the countershaft and any idle gears on the transmission shaft meshing therewith is different from the speed of the transmission shaft, and these speeds must be synchronized before two toothed gear members, gears or clutches, can be brought into mesh without clashing. When the engine clutch is disengaged, the transmission shaft running under momentum of the vehicle becomes a driver, although the countershaft has considerable momentum, when the main clutch is disengaged.

In the operation of this synchronizing mechanism, the initial shifting of the gear 6 by the fork 8 first causes the poppets 18 to coact with the cam surfaces 17, and in so doing, force the synchronizing ring or second friction clutch section 13 into engagement with the first friction clutch section or friction ring 12, thus causing the gears 3 and 6 to be connected through a friction clutch capable of slipping, as these two gears are rotating at different speeds. As the gear 6 on the transmission shaft is now temporarily the driver for the reason before mentioned, the advance portions 16$^a$ of the teeth 16 which fit between the teeth 15 with a clearance, take up the clearance 20 on one side which brings the advance corners of the teeth 15 into line with the shoulders 19, and this condition persists as long as there is any differential speed between the gears 3 and 6. The friction between the first clutch section or friction ring 12 and the second clutch section or synchronizing ring 13 synchronizes the speed of the gears 3, 6 and at the same time, the momentum of the countershaft has been dying down, due to the fact that the engine clutch is disconnected, permitting the teeth 15 to lag behind the narrower portions 16$^a$ of the teeth 16 and thus again separate therefrom and open up the clearance 20 and consequently permit the teeth 15 to lose their engagement with the shoulders 19, and if pressure continues to be applied to the gear shifting lever, permits the teeth 15 to enter between the wider portions 16$^b$ of the teeth 16. During this operation, the teeth 10 of the gear 6 move into interlocking clutch engagement with the teeth 11 of the gear 3, thus clutching these gears 3 and 6 together, after their speed has been synchronized. For facilitating the continued shifting movement of the gear 6, or the disengagement of the corners or shoulders 19 from the corners of the teeth 15, when the speeds are synchronized, these corners, as seen in Figure 2, may be bevelled more or less. The shoulders 19 and the narrower portions 16ª of the teeth 16 constitute means for preventing complete shifting of the gear 6 until after the speeds of the gears 3 and 6 have been synchronized and for permitting continued shifting when the speeds of the gears 3 and 6 are synchronized.

What I claim is:—

1. A synchronizing clutch comprising three sections, the first and second sections being frictionally engageable by an axial movement, and the third section rotatable with and shiftable axially with and relatively to the second section, sets of slidably interengaging clutch teeth on the second and third sections respectively, the teeth of one set having advance narrow portions fitting with a clearance between the teeth of the other set, and wider rear portions for slidably fitting, without clearance, between the teeth of the other set, providing shoulders for engaging the ends of the teeth of said other set when the third section is initially shifted, some of the teeth of said other set having cam faces on their ends toward the former set, and spring-pressed poppets carried by the section provided with the teeth having narrow and wide portions, said poppets being arranged to coact with the cam faces upon initial shifting movement of the third section.

2. A synchronizing clutch including first and second frictionally engageable sections, the second section being shiftable into and out of engagement with the first, a third clutch section rotatable with the second clutch section and shiftable axially therewith and relatively thereto, the second and third sections having slidably engaged clutch teeth, one set of teeth having narrow advance portions and wider rear portions, the advance portions fitting between the teeth of the other set with a clearance permitting slight relative rotary movement of the second and third sections and the rear wider portions substantially fitting the spaces between the teeth of the other set and providing shoulders for engaging the advance ends of the teeth of the other set, when the third section has been initially shifted a predetermined distance relatively to the second section, some of the teeth of the other set having cam-shaped advance ends and spring-pressed poppets carried by the section provided with the teeth having the advance narrow and wider rear portions and arranged to coact with said cam faces during the initial part of the shifting-in movement of the third section; in combination with two members having teeth to be brought into interfitting engagement, one member being rotatable with the first section and the other being shiftable and rotatable with the third section.

3. A synchronizing clutch comprising three sections, the first and second sections being frictionally engageable by an axial movement and the third section rotatable with and shiftable axially with, and also relatively to, the second section, sets of slidably engaging clutch teeth on the second and third sections, the teeth of one set having narrow advance portions arranged and fitting with a clearance, between the teeth of the other set, the wider rear portions slidably fitting without clearance between the teeth of the other set and providing shoulders for engaging the teeth of the other set when the third section is initially shifted, the advance and rear portions of each tooth being arranged in axial alinement, and spring means interposed between the second and third sections and at an angle to the axial shifting movement of the sections for yieldingly permitting the shifting movement of the third section relatively to the second section, when the axial shifting movement of the second section is stopped, and clutch teeth rotatable, as a unit, with the first and third sections and brought into engagement by the axial shifting of the third section, when the shifting movement of the second section is stopped.

4. A synchronizing clutch comprising three sections, the first and second sections being frictionally engageable by relative axial movement, and the third section rotatable with, and shiftable axially with, and also relatively to, the second section, sets of slidably engaging clutch teeth on the second and third sections, the teeth of one set having narrow advance portions arranged and fitting with a clearance between, the teeth of the other set, the wider rear portions slidably fitting without clearance between the teeth of the other set and providing shoulders for engaging the teeth of the other set when the third section is initially shifted, the advance and rear portions of each tooth being arranged in axial alinement, the set of teeth on one section being formed with inclined cam surfaces facing outwardly radially and the section on which the other set of teeth is provided, being provided with spring-pressed poppets for acting in a radial direction on the cams, and clutch teeth rotatable respectively with the first and third sections and being brought into engagement during relative axial movement of the second and third sections against the reaction of the spring poppets.

CARL D. PETERSON.